United States Patent Office 2,789,977
Patented Apr. 23, 1957

---

2,789,977

VERATRUM ALKALOIDS AND RECOVERY THEREOF

Chester John Cavallito, Decatur, Ill., assignor to Irwin, Neisler and Company, Decatur, Ill., a corporation of Illinois No Drawing. Application March 25, 1953,
Serial No. 344,678

1 Claim. (Cl. 260—236)

The present invention relates to alkaloids and the recovery thereof from source materials. The invention is more particularly concerned with a novel procedure for the treatment of Veratrum materials to prepare certain alkaloids and derivatives thereof by a combination of chemical and extraction techniques, and with specific products produced thereby.

This application is a continuation-in-part of a prior-filed application Serial 288,308, filed May 16, 1952, by C. J. Cavallito.

Veratrum and extracts thereof have been used in the treatment of various forms of hypertension, the compounds being especially suitable therefor because of their vasodilative activity. In general, there are many different varieties of Veratrum, however, *Veratrum viride*, *Veratrum album*, *Veratrum sabadilla*, *Veratrum californicum*, and *Veratrum escholtzii* are the most common. Generally speaking, physiologically active extracts are generally obtained by treating the powdered roots and rhizomes with mild aqueous alkalizing agents, e. g., aqueous ammonia or limewater. This alkaline-treated material was at least partially dried, extracted with hydrocarbon solvents, and the crude alkaloids used as their acid addition salts. These crude mixtures were used per se for clinical administration.

Despite the extracts' excellent hypotensive activity, the materials have not been generally used or widely accepted due to the fact that nausea, vomiting and general emetic effects usually encountered in clinical administration outweigh its primary utility. Prior to the provision of the materals and procedures herein described, the minimum therapeutic level was at a concentration which usually results in very significant emetic effects. The precise structural formulae of extracted materials of Veratrum have not been conclusively proven. However, it is known that there are both non-ester and ester components of Veratrum.

It is therefore, a principal object of the present invention to provide a series of Veratrum alkaloid materials having significant hypotensive activity without the usual concomitant emetic effect. Another object of the present invention is to provide certain specific alkaloids, or certain alkaloid materials, obtained by suitable treatment of specific forms of Veratrum. Still another object of the present invention is to provide certain materials having hypotensive activity, extracted from *Veratrum viride* and *Veratrum album*. A further object of the present invention is to provide a procedure for the preparation of such materials. Other objects will become apparent hereinafter.

The process of the present invention includes, as its first step, a part of the procedure recited in Serial No. 288,308 above-identified. This step comprises treating *Veratrum viride* or *Veratrum album* with a mixture of a (*a*) non-polar solvent and a (*b*) sterically-hindered amine, the boiling point values of (*a*) and of (*b*) being of comparable magnitude.

In carrying out the first step of the procedure of the present invention, a continuous extraction system is preferably employed. However, a partial extraction and recovery procedure is operative, especially percolation or maceration processes, although larger quantities of the solvent and basic amine reagents are required and smaller yields are achieved. The preferred continuous extraction apparatus may include a continuous extractor designed to hold the starting Veratrum plant powder and to afford continuous exposure of the material to the amine base reactant and solvent, and a distillation flask or still equipped with condensing means to facilitate condensation of the distilled solvent and unused amine to insure continued, repeated contact of the Veratrum powder with the liquid phase of the reaction mixture. A heat source to provide co-distillation of the components of the reaction medium is also necessary.

The Veratrum is collected in a suitable manner, dried, and the material ground to form a powder. The dried Veratrum powder is placed in the extractor unit of the extraction apparatus and the solvent reaction mixture placed in the distillation flask or still. Application of heat then initiates the vaporization and distillaton of both components of the mxture. Continued, gentle heating facilitates continuous chemical conversion and extraction of the desired alkaloids from the plant material in the form of their free bases. Alternatively, a percolation apparatus may be used, if desired. Generally, the percolation is repeated at least once with fresh solvent mixture.

The solvent component of the reaction mixture is a non-polar solvent that is non-reactive with the alkamine esters and must be capable of selectively extracting the desired alkaloids without simultaneously extracting glycosidic alkaloids and certain other impurities. In addition, the boiling point of the preferred solvent is in the same range as that of the amine base employed as the basic chemical reagent, i. e., preferably within about 50 to 25 centigrade degrees of each other. A preferred boiling range is between about 60 and about 120 or more degrees centigrade. Preferred solvents are benzene, toluene and aliphatic hydrocarbons, such as heptanes, octanes, or petroleum fractions such as Skellysolves B and C, although certain halogenated hydrocarbons such as fluorobenzene and fluorochlorobenzene are operative solvent embodiments. Solvents such as dioxane, tetrahydrofurane, acetone, ethyl acetate and the like are capable of exerting solvent action but generally extract too many of the plant impurities, thereby rendering the subsequent removal of the desired components more difficult. Certain alcohols can be employed, but generally their use leads to appreciable alcoholysis of the desired alkaloids.

The basic amine reagent is preferably a tertiary amine, but sterically-hindered non-reactive secondary amines are satisfactory. However, the amine chosen should be capable of reacting chemically with the active Veratrum components. Triethylamine is the most preferred basic amine reagent. Other tertiary amines, for example, dimethylethylamine, dipropylmethylamine, diisopropylmethylamine, dipropylethylamine, propyldimethylamine, and the like, as well as sterically-hindered secondary amines, such as diisopropylamine, di-tertiary-butyl-amine, et cetera, are operative, especially when employed with a solvent having approximately the same boiling point. In general, aliphatic sterically-hindered amines containing from four to eight carbon atoms, inclusive, are operative basic amine reagents. It is desirable that the boiling point of the selected basic amine reagent be roughly commensurate with the chosen solvent so that, as the solvent is distilled during the extraction, the amine can perform its function of chemically reacting with and converting the desired Veratrum component to free bases. The alkaloids are thus extracted by the amine reagent and the solvent. In general, tertiary amines are preferred, although secondary or primary amines which do not result in aminolysis or ester hydrolysis may be useful. The amine reagent employed must neither saponify the ester linkage nor inactivate the desired component, yet must be fairly volatile so that it will be carried over with the extracting solvent in the continuous extraction procedure and will be easily removed in the subsequent recovery step without contaminating the desired alkaloids. The ratio of amine reagents to extracting solvent is not critical, the amine in the amount of about one-half to about five percent of the solvent employed is very satisfactory. In fact, the amount of amine reagent is more properly related to the weight of the Veratrum powder being extracted. For example, from five milliliters to twenty or thirty milliliters of triethylamine per kilogram of crude Veratrum powder is sufficient to convert the desired alkaloid into its free base form and permit recovery thereof. Higher amounts of the amine reagent do not appear detrimental. Under optimum conditions the overall ratio of the volume of the reaction medium, containing the solvent and amine reagent, to weight of Veratrum powder being extracted, is properly a function of the size and shape of the extraction apparatus.

Generally, the preferred continuous extraction is carried out for the period of between about four and ten hours or more, the precise length of time depending upon the type of extraction apparatus, the quantities of materials being subjected to reaction, and the amounts of solvents and amine reagent employed. During such procedure, the amine reagent reacts with the amorphous alkaloids which are usually present in the crude Veratrum as salts associated with organic acids, to form a free base, which is carried over together with the solvent into the distillation flask or still. Frequently, an inert desiccant, such as Drierite, anhydrous magnesium sulfate, anhydrous copper sulfate, et cetera, is placed in the still to absorb whatsoever moisture may have been driven off from the Veratrum powder, which moisture, if permitted to remain in contact with the free basic alkaloid materials would hydrolyze some of the ester portion of the molecules. Alternatively, a chemical desiccant, such as calcium oxide, magnesium oxide, or those hereinbefore mentioned, may be mixed or interlayered with the Veratrum in the extraction chamber.

After separation of the spent Veratrum powder upon completion of the conversion and extraction of the procedure described hereinbefore, the combined reaction mixture, containing free bases of the ester alkaloid material is concentrated by the distilling off of substantially all of the remaining amine reagent and solvent. This concentrated extract is used directly in the following steps of the procedure.

When the amine treatment of the Veratrum powder has been completed, the crude extract thus obtained may be directly treated with an acid, preferably in the presence of a minimum amount of water. Representative acids which may be employed include, for example, hydrochloric, hydrobromic, nitric, sulfuric, acetic, phosphoric, tannic, et cetera. However, the hydrohalide acids and acetic acid are preferred. The acid is employed in an amount which will cause precipitation of substantially all of the alkaloids and in a slight excess, if possible. When the hydrohalide acids are used, they may preferably be added as saturated ethereal solutions and this will cause precipitation of the alkaloid with most of the impurities remaining in solution. Of course, filtration or other methods of separation of the precipitate allows isolation of the alkaloid materials. Treatment with an acid is accomplished usually at room temperature or below, however, other temperatures may be employed and the time necessary will be only that amount of time required to assure complete formation of the acid addition salts of the alkaloid materials, usually less than one-half hour. Stirring or other agitation will lessen the time required. Separation of the alkaloid acid addition salts is readily accomplished by decantation, filtration, or centrifugation.

After acidification and separation of the alkaloid mixture, the next step comprises treating an essentially aqueous solution of the acid salts of the alkaloids with ammonia, or ammonium hydroxide, so as to cause precipitation of the substantially pure alkaloid material. Prior to the ammonia treatment, it is necessary that the acid salt of the alkaloid be brought into solution in a solvent miscible with water, or otherwise soluble therein. Representative solvents which are suitable, include, for example, acetic acid, ethanol, methanol, acetone, propanol, isopropanol, et cetera. The solvent is added to form a slurry, diluted with five or more parts of water and filtered clear of insoluble matter. The ammonia added to the filtrate is usually employed in a slight excess, to insure complete precipitation of all the alkaloid material. Room temperature or below is usually employed. Stirring or other agitation will assure rapid and complete contact of the reactants and is preferably employed. Treatment with ammonia causes precipitation of an alkaloid mixture having substantial hypotensive activity.

By dissolving this alkaloid mixture in an aromatic solvent, such as, for example, benzene, toluene, xylene, et cetera, filtering and treating the resulting solution with an aliphatic hydrocarbon solvent, in the case of a species of *Veratrum viride*, there will be precipitated a free alkaloid having the probable molecular formula

$$C_{32}H_{29}O_6N$$

conveniently referred to as Alkaloid III. In the case of a species of *Veratrum album*, a similar treatment will yield a material whose structure has not been conclusively identified, conveniently referred to as Alkaloid V.

Acid addition salts of the foregoing alkaloids may be readily prepared by dissolving the free alkaloid in a suitable organic solvent, such as, for example, benzene, toluene, ether, dioxane, heptane, isopropanol, acetone, et cetra, and adding the acid thereto, either per se or in a suitable organic solvent. Usually the acid addition salt will precipitate immediately. Representative acids which are suitable for the formation of acid addition salts, include, for example, hydrochloric, hydrobromic, hydriodic, nitric, phosphoric, sulfuric, maleic, acetic, tannic, pectic, pectinic, et cetera.

The free alkaloids and acid addition salts thereof have utility for clinical administration as hypotensive agents having a greatly increased level of therapeutic effectiveness as compared with the level normally causing vomiting and nausea. For example, Alkaloid III has a therapeutic effectiveness by assay in dogs at a level one-fourth that amount which causes nausea and vomiting. These materials may be administered in isotonic solutions, as oil solutions, and/or compounded with other physiologically active materials to yield hypotensive agents having outstanding utility.

The following examples are given to illustrate certain procedures of the present invention, but said invention is not limited thereto, as apparent equivalents will be known to those skilled in the art.

*Example 1.—Initial extraction technique*

Continuous extraction apparatus was employed, including an extractor designed to contain the starting plant materials, a distillation flask to hold the solvent mixture, the flask being equipped with a reflux condenser, a drip device to facilitate the removal of the volatilized mixture from the condenser and to percolate it through the continuous extractor, and a Soxhlet type return. Means for heating the continuous extraction system were provided.

One thousand grams of *Veratrum viride* powder was placed in a continuous plant extractor and a mixture of 2000 milliliters of benzene and twenty milliliters of triethylamine was poured over a Veratrum powder in the reactor and permitted to siphon into the distillation flask. Approximately fifty grams of an inert desiccant (Drierite) was added to the distillation flask, heat applied to initiate the distillation of the reaction mixture in the flask, and the continuous extraction procedure continued for eight hours, during which time constant, gentle heat was applied to insure refluxing of the mixture (about eighty to ninety degrees centigrade). The extraction procedure was discontinued and the contents of the distillation flask filtered. The resulting filtrate was concentrated by distilling off and recovering a large portion of the benzene solvent together with virtually all of the triethylamine base. Fifty milliliters of the concentrated benzene solution was thus obtained.

*Example 2.—Initial extraction technique*

A percolation apparatus was filled with one thousand grams of *Veratrum viride* powder, fifty grams of an inert desiccant (Drierite) intimately mixed therewith and a mixture of 500 milliliters of benzene and ten milliliters of triethylamine poured over the mixture. The mixture was allowed to stand over night, after which the solvent solution was allowed to slowly run out of the percolator. This procedure was repeated three times. The resulting extracts were combined, and the excess triethylamine and benzene distilled off to yield fifty milliliters of a concentrated benzene solution of mixed Veratrum alkaloids.

*Example 3.—Alkaloid mixture*

Fifty milliliters of the concentrated benzene solution, obtained as described in Examples 1 and 2, supra, was rapidly stirred, and a saturated solution of hydrogen chloride in ether added to the concentrated benzene solution until no more precipitate was obtained. The resulting precipitate was recovered by filtration and comprised the crude hydrochlorides of the extracted alkaloids and the hydrochloride of any unrecovered triethylamine. This material was dried by heating at a temperature of about 75 degrees centigrade for six hours, the crude, dried precipitate ground with fifty milliliters of isopropanol and to this slurry was added 1000 milliliters of water. The resulting mixture was filtered. To the clear filtrate, cooled to five degrees centigrade, there was slowly added with rapid stirring, a ten percent aqueous solution of ammonium hydroxide, until complete precipitation was accomplished. The precipitate was filtered off, washed with water and dried by heating at about 75 degrees centigrade for six hours.

There was thus obtained a mixture of *Veratrum viride* alkaloids having substantial utility as a hypertension reducing agent, without the concomitant marked side-actions normally assoicated with the clinical use of *Veratrum viride* extracts. This material may be clinically administered in this form, or further purification may be performed as described hereinafter.

*Example 4.—Alkaloid mixture*

Approximately 200 pounds of *Veratrum viride* was reduced to a volume of three gallons following the procedure described in Examples 1 and 2. To this material was added 150 milliliters of saturated ethereal hydrogen chloride solution, causing precipitation of the crude alkaloid materials and extraneous amines. The resulting precipitate was separated by centrifugation, and the material allowed to stand at room temperature for two days to dry. The crude, dried precipitate was next ground with one quart of isopropanol, and three gallons of water added thereto. The resulting mixture was filtered and the precipitate discarded. To the clear filtrate, cooled to a temperature of about five degrees centigrade, there was added slowly with rapid stirring ten fluid ounces of aqueous ten percent ammonium hydroxide. The resulting precipitate was filtered, washed with water and dried by allowing to stand at room temperature in the presence of air for one week. This material is a Veratrum alkaloid mixture and may be used for clinical administration, per se, or it may be further purified following the procedures hereinafter described.

*Example 5.—Alkaloid III*

One hundred grams of the alkaloid material prepared by the procedures of Examples 3 and 4 was dissolved in a liter of benzene and the resulting mixture filtered. The filtrate was diluted with approximately four liters of an aliphatic hydrocarbon solvent (Skellysolve B) and the resulting mixture filtered. The filtrate was cooled with Dry Ice to cause precipitation, and the alkaloid removed by filtration. There was thus obtained an alkaloid, which, for convenience, is called Alkaloid III, having analytical values consistent with a molecular formula $C_{32}H_{49}O_6N$, apparently an ester of a tertiary alkamine.

*Analysis.*—Calculated for $C_{32}H_{49}O_6N$: C, 70.68; H, 9.08; N, 2.58. Found: C, 70.79, 70.92, 70.82; H, 9.16, 9.34, 9.23; N, 2.80.

This material sinters at a temperature above about 125 degrees centigrade and melts at 130–135 degrees centigrade; ultra-violet absorption; $\lambda$ maximum 255 m$\mu$, $\lambda$ minimum 240 m$\mu$. It contains one ester group and no N-methyl groups.

*Example 6.—Alkaloid III acetate*

One hundred grams of the alkaloid material prepared by the procedures of Examples 3 and 4 was dissolved in a liter of benzene and the resulting mixture filtered. The resulting clear filtrate was treated with two liters of an aliphatic hydrocarbon solvent (Skellysolve B) and 500 milliliters of glacial acetic acid. The precipitate which formed was collected, filtered and dried and comprised the acetate salt of Alkaloid II as an amorphous, hydroscopic salt.

*Example 7.—Alkaloid III*

About twenty grams of the acetate salt of Alkaloid III was dissolved in 300 milliliters of water, to which was added fifty milliliters of an aqueous ten percent ammonium hydroxide solution. The precipitate which resulted was recovered by filtration and comprised an almost quantitative yield of Alkaloid III.

*Example 8.—Alkaloid IV*

To 200 milligrams of the free Alkaloid III, in thirty milliliters of fifty percent ethanol, was added five equivalents of 0.1 Normal sodium hydroxide solution and the resulting mixture heated on a water bath for thirty minutes. Upon cooling, the solution was back titrated with 0.1 Normal hydrochloric acid, the resulting titration curve indicating that one acid group had been liberated by the saponification. The solution was then diluted with water and again made alkaline, the free alkaloid base separating. Re-precipitation from an ethanol-water mixture yielded a purified product, melting at 240 degrees centigrade, and having a probable molecular formula $C_{27}H_{32}O_2N$.

*Analysis.*—Calculated for $C_{27}H_{32}O_2N$: C, 78.40; H, 10.47; N, 3.38. Found: C, 78.53; H, 10.41; N, 3.44.

*Example 9.—Alkaloid III tannate*

Twenty grams of Alkaloid III was dissolved in 200 milliliters of isopropyl alcohol at room temperature and a mixture of thirty grams of tannic acid dissolved in 300 milliliters of isopropyl alcohol, maintained at forty to fifty degrees centigrade was added thereto with rapid stirring. The mixture was cooled to twenty centigrade, filtered and the precipitate dried at about eighty degres centigrade. There was thus obtained 33.5 grams of the tannate salt of Alkaloid III, as a pale yellow amorphous powder, relatively insoluble in water, and having an indefinite melting point.

Example 10.—Alkaloid III hydrochloride

Ten grams of Alkaloid III was dissolved in 100 milliliters of benzene and 100 milliliters of saturated ethereal hydrogen chloride added thereto. The resulting precipitate was recovered by filtration, washed with ether and dried. There was thus obtained the hydrochloride salt of Alkaloid III, which sinters at 200 degrees centigrade and decomposes at 210 degrees centigrade.

*Analysis.*—Calculated for $C_{32}H_{50}O_6NCl$: C, 66.24; H, 8.69. Found: C, 66.03; H, 8.71.

In a manner similar to that of Examples 9 and 10, other acid salts of Alkaloid III may be prepared, such as, for example, the pectate, pectinate, nitrate, sulfate, phosphate, et cetera. Using these procedures, it is also possible to prepare acid addition salts of mixtures containing Alkaloid III, for example, the alkaloid mixture of Examples 3 and 4, supra.

Example 11.—Alkaloid V

In a manner similar to that of Examples 1, 2, 3 and 4, *Veratrum album* powder was treated with benzene and triethylamine, the solvents removed, hydrogen chloride added, the precipitate separated, dried, ground with isopropanol and water, ammonium hydroxide added, and an alkaloid mixture obtained. One hundred grams of this material was dissolved in a liter of benzene and the resulting mixture filtered. The filtrate was diluted with four liters of an aliphatic hydrocarbon solvent (Skellysolve B) and the resulting mixture filtered. The filtrate was cooled with Dry Ice, and the precipitated alkaloid recovered. There was thus obtained Alkaloid V, sintering at 125–130 degrees centigrade and melting at 135–140 degrees centigrade.

Example 12.—Alkaloid V hydrochloride

Twenty grams of Alkaloid V was dissolved in 200 milliliters of benzene and 150 milliliters of saturated ethereal hydrogen chloride added thereto. The resulting precipitate was recovered by centrifugation, washed with ether and dried. There was thus obtained Alkaloid V hydrochloride.

Various modifications may be made in the method and products of the present invention without departing from the spirit or scope thereof, and it is to be understood that I limit myself only as defined in the appended claim.

I claim:

In a process for recovering a hypotensively-active alkaloid from a Veratrum plant containing the same, the step of: subjecting the plant to a continuous extraction with a mixture of a lower-alkyl tertiary amine and a solvent non-reactive with the alkamine esters of the plant, said amine and solvent having a boiling point within about fifty centigrade degrees of each other.

References Cited in the file of this patent

UNITED STATES PATENTS

| | | |
|---|---|---|
| 2,228,040 | Voogt | Jan. 7, 1941 |
| 2,649,442 | Glen et al. | Aug. 18, 1953 |
| 2,727,891 | Kusserow et al. | Dec. 20, 1955 |

OTHER REFERENCES

Fried et al.: J. Am. Chem. Soc., vol. 72, pp. 4621–4630 (1950).

Jacobs et al.: J. Biol. Chem., vol. 160, pp. 555–565 (1945).

Jacobs et al.: J. Biol. Chem., vol. 191, pp. 71–86 (July 1951).

Meyer: High Polymers, vol. IV, p. 576 (Interscience Publishers), N. Y. (1942).

UNITED STATES PATENT OFFICE

CERTIFICATE OF CORRECTION

Patent No. 2,789,977                                                               April 23, 1957

Chester John Cavallito

It is hereby certified that error appears in the printed specification of the above numbered patent requiring correction and that the said Letters Patent should read as corrected below.

Column 4, line 34, the formula should appear as shown below instead of as in the patent —

$$C_{32}H_{49}O_6N$$

Signed and sealed this 15th day of October 1957.

(SEAL)
Attest:
KARL H. AXLINE

Attesting Officer

ROBERT C. WATSON
Commissioner of Patents